United States Patent
Jenney

(10) Patent No.: US 6,349,335 B1
(45) Date of Patent: Feb. 19, 2002

(54) COMPUTER SYSTEM, PROGRAM PRODUCT AND METHOD FOR MONITORING THE OPERATIONAL STATUS OF A COMPUTER

(75) Inventor: Eric Howland Jenney, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/227,910

(22) Filed: Jan. 8, 1999

(51) Int. Cl.[7] .............................................. G06F 13/00
(52) U.S. Cl. ........................ 709/224; 709/223; 709/206; 706/50; 714/47; 714/48; 714/49
(58) Field of Search ................................. 709/224, 223, 709/206; 706/50; 714/47, 48, 49

(56) References Cited

U.S. PATENT DOCUMENTS

| | | | | |
|---|---|---|---|---|
| 5,566,339 A | * | 10/1996 | Perholtz et al. | 713/340 |
| 5,621,892 A | * | 4/1997 | Cook | 709/224 |
| 5,696,486 A | * | 12/1997 | Poliquin | 340/506 |
| 5,715,393 A | * | 2/1998 | Naugle | 709/224 |
| 5,781,703 A | * | 7/1998 | Desai et al. | 706/50 |
| 6,058,420 A | * | 5/2000 | Davies | 709/224 |
| 6,092,102 A | * | 7/2000 | Wagner | 709/206 |
| 6,094,681 A | * | 7/2000 | Shaffer | 709/224 |
| 6,189,108 B1 | * | 2/2001 | Cromer et al. | 713/340 |
| 6,269,401 B1 | * | 7/2001 | Fletcher et al. | 709/224 |

* cited by examiner

Primary Examiner—Viet D. Vu
Assistant Examiner—Debbie M Le
(74) Attorney, Agent, or Firm—Wood, Herron & Evans

(57) ABSTRACT

An apparatus, program product, and method is provided for monitoring a remote computer to determine the existence of a status signal indicating that the remote computer is operational. The monitoring computer interprets a sudden absence of the status signal within a predetermined time period as a non-operational status of the remote computer. In response to the non-operational status of the remote computer, the monitoring computer generates an alert sequence to alert personnel that the remote computer is non-operational. The alert sequence may alert various personnel, including the user of the remote computer or security personnel, depending upon the time of day that the alert sequence is generated. Inputs from the user determine the frequency of the monitoring process and also the method of contacting personnel upon an alert sequence. The user may selectively start and stop the monitoring process as desired for minimal disruption of computer operation and workflow.

23 Claims, 4 Drawing Sheets

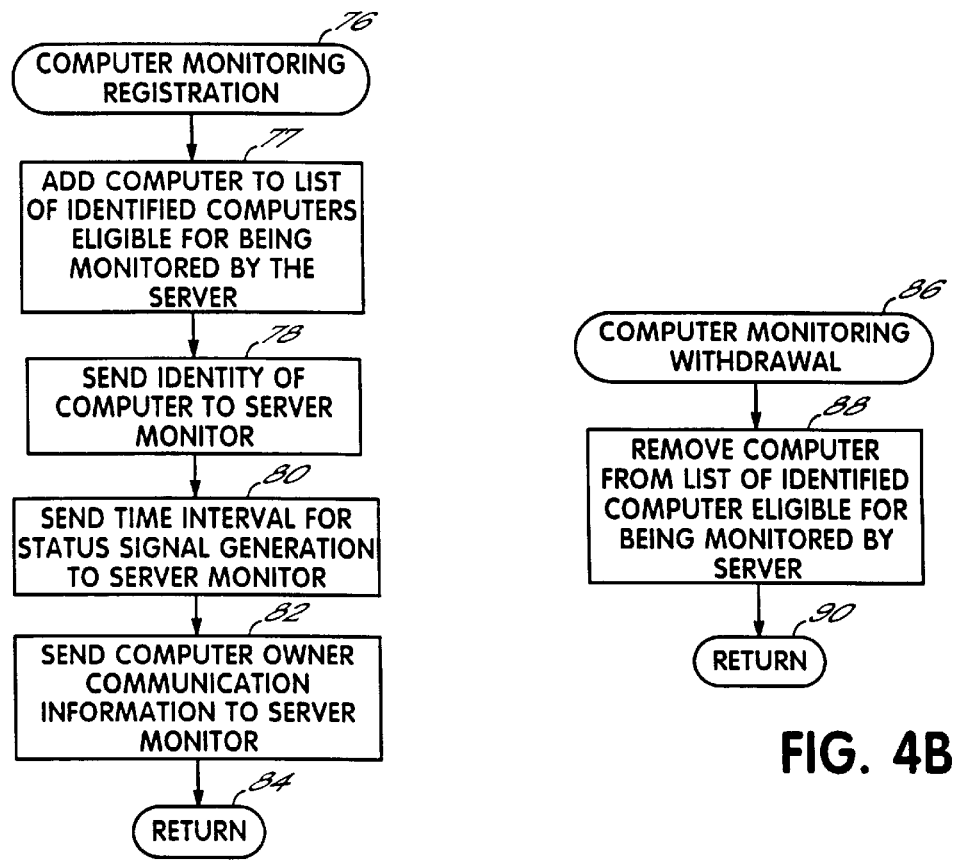
FIG. 4A
FIG. 4B
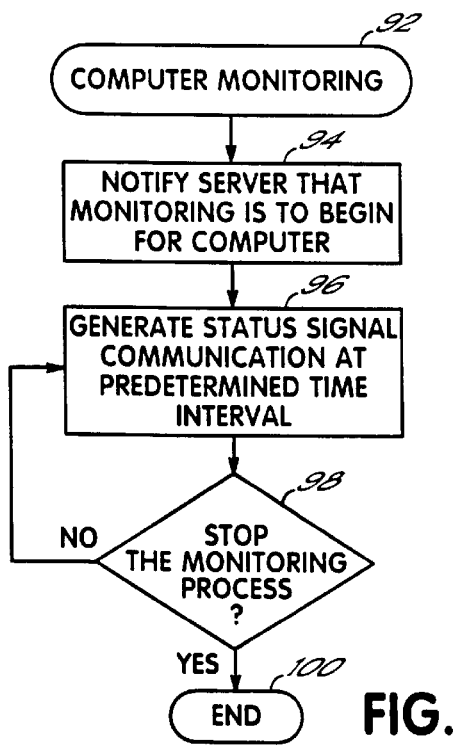
FIG. 5

COMPUTER SYSTEM, PROGRAM PRODUCT AND METHOD FOR MONITORING THE OPERATIONAL STATUS OF A COMPUTER

FIELD OF THE INVENTION

This invention is generally related to computers and computer software. More specifically, the invention is generally related to determining the operational status of a computer, such as for the purpose of deterring computer component loss due to theft or for the purpose of determining the status of a long-running compile or test.

BACKGROUND OF THE INVENTION

Because of the widespread use of computers, various entities, such as corporate entities and governmental entities, utilize large numbers of personal computers or PCs. Such PCs are often positioned in various remote locations, e.g., users' offices, and might be connected to each other through a server computer which creates a network, such as a local area network or LAN. Usually, the individual employees of the entity will have their own PC with which they interact on a regular basis. Those employees or users will be using their computers, or will be in proximity to their computers during certain times of the day within a work week, as defined by the normal working hours of the particular entity. At other times, the PCs will be unattended, such as during hours outside of the normal working hours, and possibly on weekends. With the user away from the computer, a window of opportunity for theft is presented.

Every PC is generally equipped with expensive electronic components such as hard disk drives and printed circuit boards containing the processor and memory components used by the PC. Disassembling a computer to remove and steal such components is not a particularly difficult task for someone who is familiar with the internal configuration of a PC. For example, the printed circuit boards holding the processor and memory are plugged into appropriate sockets in the computer and may be readily unplugged and removed. Consequently, PC component theft is on the rise.

Such theft generally occurs when the PCs are unattended. A thief will generally disassemble the computer and pull the processor and memory boards or cards from their respective sockets. Such boards are small and may be readily slipped into a pocket or bag. Consequently, large numbers of boards may thus be stolen without drawing significant attention to the thief. After such a theft, the PC or other computer is inoperable and the boards and any other stolen components must be replaced. Accordingly, there is a need to reduce such component loss by theft.

An unattended PC might also present other problems in addition to component theft. Specifically, a user may leave their PC running while they are away from their office, in order for the PC to complete time-consuming tasks, which might otherwise take up significant time during the workday. For example, a user may run a time-consuming compile or test procedure when they have left their office for the day so that the compile or test will be complete when they return the next day. If the computer or the network and server to which it is connected malfunctions, often termed a computer or system "crash," the user will return the next day to find that the desired procedure was not completed. Valuable time during the work day may then be lost re-running the compile or test. Therefore, it is desirable for a user to know that their computer is operating when they are away from their office for any extended period of time.

One way to reduce theft and provide ongoing monitoring of the operation of a computer would be to increase security measures, such as having a security guard or some other personnel routinely attend to each computer in a facility on a regular basis to verify that it is still operating. In large entities which have thousands of computers, such a solution is impractical and expensive.

Other solutions have been proposed wherein additional hardware elements are incorporated into the computers to facilitate monitoring of the computers by another computer. However, such a solution requires that another system board be installed in the computer being monitored. Such an installation is expensive, not only from the additional cost of a system board associated with the monitoring system, but also the time spent by personnel in making the actual installations in each computer. Accordingly, requiring a hardware update would generally not be an acceptable alternative for very large entities that have large numbers of computers, such as PCs.

Accordingly, there is a need to reduce computer component theft and the monetary loss associated therewith and to reduce such theft without incurring offsetting expenses associated with a theft prevention system.

There is a further need to reduce and deter component theft in a way that would be adaptable to the work schedule of the computer user and also the operational schedule of the particular computer.

There is also a need to detect a computer failure or crash during operation when the user is not attending the computer so that such a failure may be addressed as soon as possible.

SUMMARY OF THE INVENTION

The invention addresses these programs and other issues associated with the prior art by providing an apparatus, program product, and method for monitoring the operational status of a computer by detecting the absence of a status signal generated by the computer. Upon detecting, via the absence of the status signal, that a computer being monitored suddenly becomes non-operational, an alert sequence is generated. In that way, personnel, such as the user of the computer, may be notified that an unattended computer is no longer operational so that theft of computer components may be deterred or the computer may again be made operational to run a long-running test or compile procedure, for example.

In accordance with one aspect of the present invention, a first computer or remote computer to be monitored generates a status signal, that is indicative that the computer is operational. A monitoring computer is in communication with the remote computer, and the monitoring computer monitors the remote computer to determine the existence of the status signal. The remote computer generates the status signal on a predetermined time interval. Similarly, the monitoring computer looks for the status signal within a predetermined time period associated with the predetermined time interval at which the status signal is generated by the remote computer. The monitoring computer interprets a signal absence within the predetermined time period as a non-operational status of the remote computer. Thereafter, the monitoring computer generates an alert sequence to alert personnel that the remote computer is no longer operational.

In accordance with one embodiment of the present invention, the alert sequence may be tailored to alert certain personnel at certain times of the day. For example, during normal work hours, the user of the computer might be notified, such as through telephone or pager calls, or an e-mail message. During non-work hours, when the user may be away from the remote computer, security personnel may be notified to handle the situation.

In another embodiment, user registers their remote computer with the monitoring computer and provides certain user information to the remote computer. For example, the remote computer needs to have the identity of the computer being monitored and needs to determine how often to expect a status signal communication from the remote user. Furthermore, the monitoring computer may be provided with telephone and pager numbers or e-mail addresses for proper contact with the user during an alert sequence. The user registers their computer with the monitoring computer and then may selectively start and stop the monitoring process such that the monitoring computer selectively monitors the remote computer, depending upon instructions from the user. In that way, the monitoring operation does not significantly interfere with the normal operation of the computer or with the work done by the user on their computer.

BRIEF DESCRIPTION OF THE FIGURES

The accompanying drawings, which are incorporated in and constitute a part of this specification, illustrate embodiments of the invention and, together with a general description of the invention given below, serve to explain the principles of the invention.

FIGS. 4A and 4B are flowcharts illustrating the program flow of registration and withdrawal programs associated with a computer being monitored, as illustrated in FIG. 1.

FIG. 5 is a flowchart illustrating the program flow of a program that is part of the PC Monitor application of FIG. 2.

DETAILED DESCRIPTION

Figure 1:
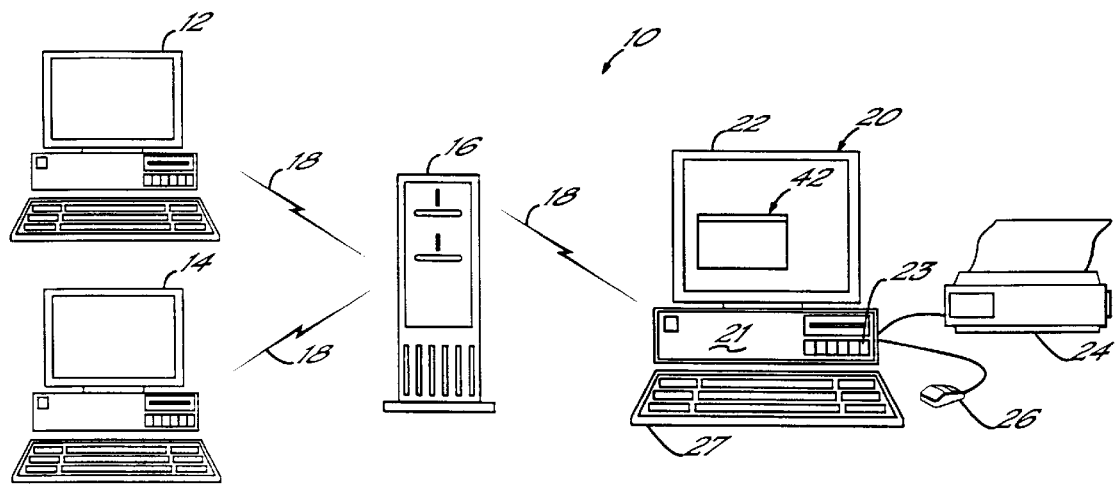
FIG. 1 is a block diagram of a networked computer system consistent with the invention.

The embodiments of the invention described herein are directed to determining the operational status of a computer, such as for the deterrence and prevention of component theft or for ensuring proper test and compile runs, for example. A first computer, or remote computer, which could be any one of a large number of computers, such as a large number of PCs, is coupled to a monitoring computer, such as a server. During a monitoring process in accordance with the principles of the present invention, the remote computer being monitored repeatedly generates a status signal communication that indicates that the computer is operational. The status signal could be any communication signal suitable for indicating to the monitoring computer or server that the remote computer is operational. For example, a handshake signal might be utilized between the remote and monitoring computers. Any other number of communications might occur between the remote and monitoring computer to indicate to the monitoring computer that the remote computer is operational, and the invention is not limited to a particular form of the status signal communication.

The monitoring computer or server detects the status signal which is generated by the remote computer at predetermined time intervals. The monitoring computer, aware of the predetermined time interval at which the remote computer will communicate, establishes a predetermined time period in which the status signal should be detected by the monitoring computer. Upon an absence of the status signal from the remote computer within a predetermined time period, and detection of that status signal absence by the monitoring computer, the monitoring computer interprets the signal absence as a non-operational status of the remote computer. At that time, in accordance with the principles of the invention, the monitoring computer generates an alert sequence to alert personnel that the first computer is not operational.

The alert sequence of the invention may take various forms and may be tailored to the particular business of an entity using the invention. For example, the alert sequence might comprise a first alert mode which is utilized during normal working hours or within a work period defined for the computer being monitored. During the first alert mode, the alert sequence could comprise a generation of a telephone call, pager call, or e-mail message to the user of the computer to indicate the non-operational status of the user's computer. Within a second alert mode, at a period of the day including after work hours and weekends, the alert sequence might comprise contact with security personnel for the entity so that such personnel may investigate the non-operational status of the computer.

To minimize the disruption of the operation of the computer and the work of its user, and to minimize unnecessary alert sequences, a user may operate their computer such that it is selectively monitored by the monitoring computer. To that end, a user may selectively register their computer with the monitoring computer or withdraw their computer from the list of remote computers that are monitored by the monitoring computer. Even after a remote computer has been registered with the monitoring computer, the owner might selectively start or stop the monitoring process as desired. Still further, upon a normal shutdown sequence for the computer being monitored, the monitoring process would automatically stop so that an alert sequence is not unnecessarily generated.

Hardware and Software Environment

Turning to the Drawings, wherein like numbers denote like parts throughout the several views, FIG. 1 illustrates a computer system 10 consistent with the invention. Computer system 10 is illustrated as a networked computer system including one or more client or remote computers 12, 14 and 20 (e.g., desktop or PC-based computers, workstations, etc.) coupled to server 16 (e.g., a PC-based server, a minicomputer, a midrange computer, a mainframe computer, etc.) through a network 18. Server 16 may serve as the monitoring computer of the invention in one embodiment. Network 18 may represent practically any type of networked interconnection, including but not limited to local-area, wide-area, wireless, and public networks (e.g., the Internet). Moreover, any number of computers and other devices may be networked through network 18, e.g., multiple servers. In the present invention, a monitoring computer is used to determine the operational status of one or more remote computers. In an embodiment described in detail herein, the monitoring computer is a server, like server 16. However, it will be recognized that other monitoring computers, such as a personal computer (PC), might be utilized instead of a server computer and the present invention is not limited to a conventional server acting as a monitoring computer. Still further, while one embodiment of the invention contemplates monitoring large numbers of personal computers or PCs, other computers might also be coupled to a monitoring computer to determine the operational status of those computers.

Client or remote computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured as computer 20, albeit typically with greater processing performance and storage capacity, as is well known in the art.

Figure 2:
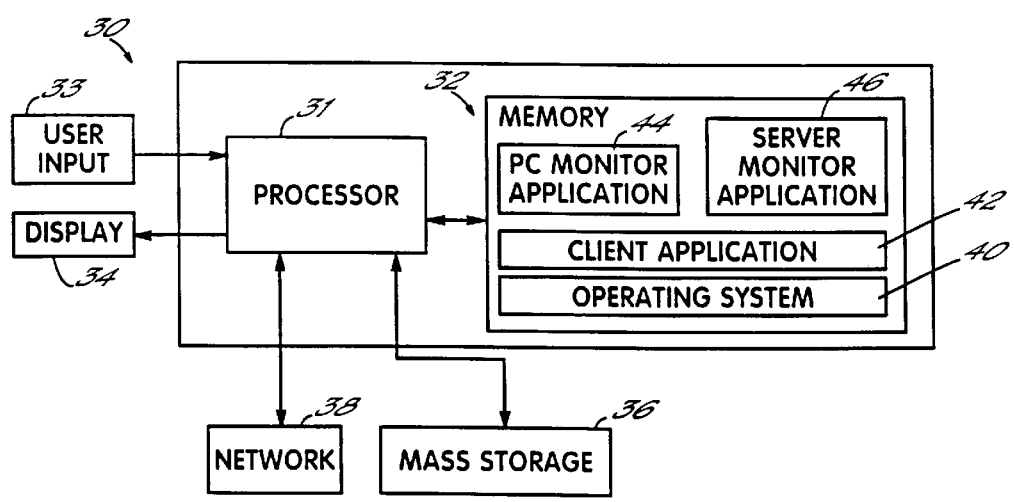
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client or remote computer (e.g., similar to computers 12, 14 and of FIG. 1), a server computer (e.g., similar to server 16 of FIG. 1), a portable computer, an embedded controller, etc. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, using a server such as server 16, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., client application 42 and a PC Monitor application 44, or Server Monitor application 46, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network. For example, in accordance with the principles of the invention, a computer to be monitored (e.g., computer 30) might execute the PC Monitor application to communicate with a server (such as server 16) while the server may execute the Server Monitor application to determine the status of each computer which is being monitored thereby. Although both applications 44, 46 are shown in one computer 30 for illustrative purposes, it will be understood that the applications will generally be run by different computers.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Computer Monitoring System

Figure 3:
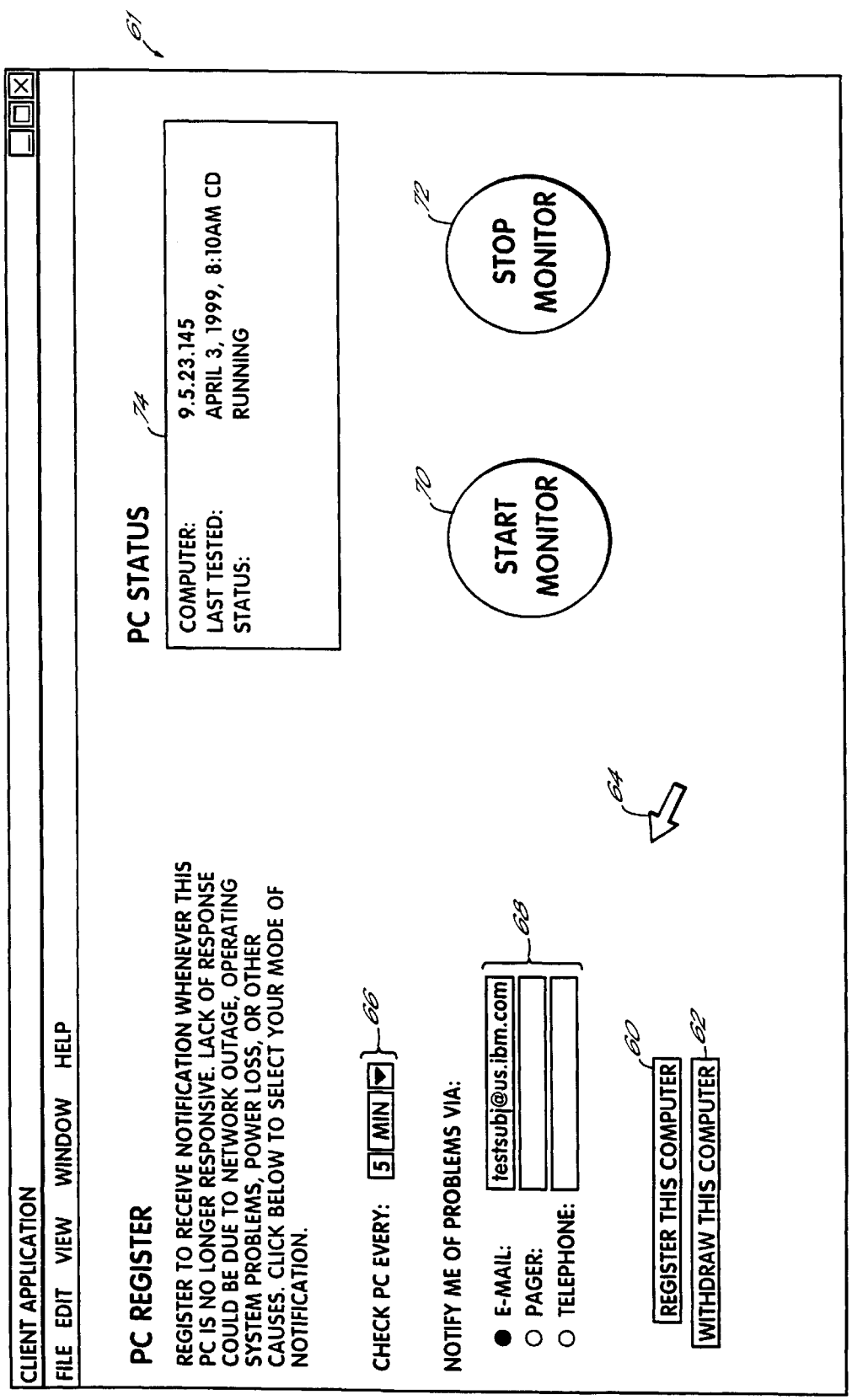
FIG. 3 is a block diagram of an exemplary computer display illustrating a user page providing user interface between a computer to be monitored and a server which will handle such monitoring, as illustrated in FIG. 1.

FIG. 3 is a schematic diagram of a user page on a computer display for registering a remote computer with a monitoring computer in accordance with the principles of the present invention. The user page is set up in the form of a window 61 on a computer display wherein inputs can be provided to the program of the remote computer, such as the PC Monitor Application 44 to register the remote computer with the monitoring computer, such as a server. While the invention is described in one embodiment with software programs existing with and run by the remote computer, it will be readily understood that an application like PC Monitor application 44, might also be utilized over a network, such as the Internet. In that case, FIG. 3 would illustrate a user page of a suitable Internet browser application which allows access to the inventive program through the Internet. As is well understood in the art, an icon or pointer 64 may be moved to the various input fields, such as with a mouse, and a click on the field will provide the desired inputs which are associated with the remote computer by the monitoring computer. First, in order to be monitored, the computer must be registered with the monitoring computer, such as a server 16, through input field 60. Similarly, a computer that was previously registered might be withdrawn from the Server 16 through an input field 62. As noted, user controlled pointer 64 is used for interfacing with the window 61 and its various input fields.

When a computer, such as remote computer 20, is registered with a monitoring computer (server 16), various information is sent from the computer 20 to the server 16 for use by the Server Monitor application 46. For example, each computer 20 will be identified by the server 16 by a certain number or letter sequence. Upon a request to register the current computer 20 with the server 16, a computer number is added to a list maintained as part of the Server Monitor application 46 of those remote computers that are to be monitored by the server 16. When registering the computer 20 with the server, additional information is requested from the user. Communication between the computer and the server, and the initiation of an alert sequence in accordance with the present invention, is based upon communications being received by the server 16 from remote computer 20 within a predetermined time period. That predetermined time period is generally determined by the computer 20, or the user of the computer, who enters a predetermined time interval through the input field 66 of window 61. The time interval entered by the user is used by server 16 to determine how often to look for the repeated communications from the computer 20 in order to determine that it is still operational, as discussed further below. In one aspect of the present invention, such as during normal working hours, the alert sequence generated by the server may include contacting the user of a remote computer, if that computer suddenly becomes non-operational. To that end, through input field 68, various telephone and pager numbers, or an e-mail address may be entered for notifying the owner, as discussed further hereinbelow.

Referring to the right side of window 61, fields 70, 72 are provided for respectively starting and stopping the monitor program for that particular computer. In that way, although a computer 20 may be registered for monitoring by the server 16, the actual monitoring process may be suspended and restarted selectively as desired by the user in accordance with the normal operation of the computer. In that way, there is minimal disruption to the normal operation of the computer and the work of its user. If desired, the status of the computer 20 being monitored might be displayed in window 61 in the PC Status field 74, which shows the identification number or identity of the computer 20, the time that it was last monitored by the server 16, and the current operational status of the computer. For example, if the computer is operational, it might be so indicated in the status field 74 by an indication of "running." Furthermore, the PC Status field 74 will also indicate to the user that their computer is registered for monitoring with the server 16. Otherwise, no status will be shown in field 74 for a non-registered remote computer.

FIGS. 4A and 4B illustrate flowcharts for routines which are part of the PC Monitor application 44 run by the computer 20 that is to be monitored. The program Computer Monitoring Registration 76 in FIG. 4A is initiated upon clicking in the field 60 in window 61. When the user indicates that they want to register the computer, the computer 20 is added to the list of identified computers eligible for being monitored by the server according to Block 77. The server 16 will generally maintain an active list of registered computers to be monitored. Next, the identity of the computer is sent to the Server Monitor application 46 in the server, as indicated by Block 78. The time interval entered by the user is also sent to the server 16 and Server Monitor application 46, as indicated by Block 80 so that the server may determine the predetermined time period in which communication is to be received by the remote computer which is being monitored. Any communication information associated with the user is also sent to the server, as indicated by Block 82, so that the user may be contacted during an alert sequence. The program then returns (Block 84). As noted, the program Computer Monitoring Registration 76 instructs the server 16 to add the particular computer 20 to the list of those computers being monitored by the server. While a computer may be registered with the server, it is not necessarily always being monitored, as discussed further hereinbelow. That is, the monitoring process may be started or stopped selectively by the user for efficient operation of the invention and minimal disruption of the user's work with the computer. The computer may also be withdrawn from the monitoring procedure through the Computer Monitoring Withdrawal application (Block 86). If the user indicates that they wish to withdraw the computer 20 from the list of those computers being monitored by the server 16, clicking on field 62 with pointer 64 will remove the computer from the list of identified computers eligible for being monitored by the server (Block 88). In that way, the Server Monitor application 46 and the monitoring computer is no longer aware of the computer 20 for purposes of monitoring and the program returns (Block 90).

Figure 6:
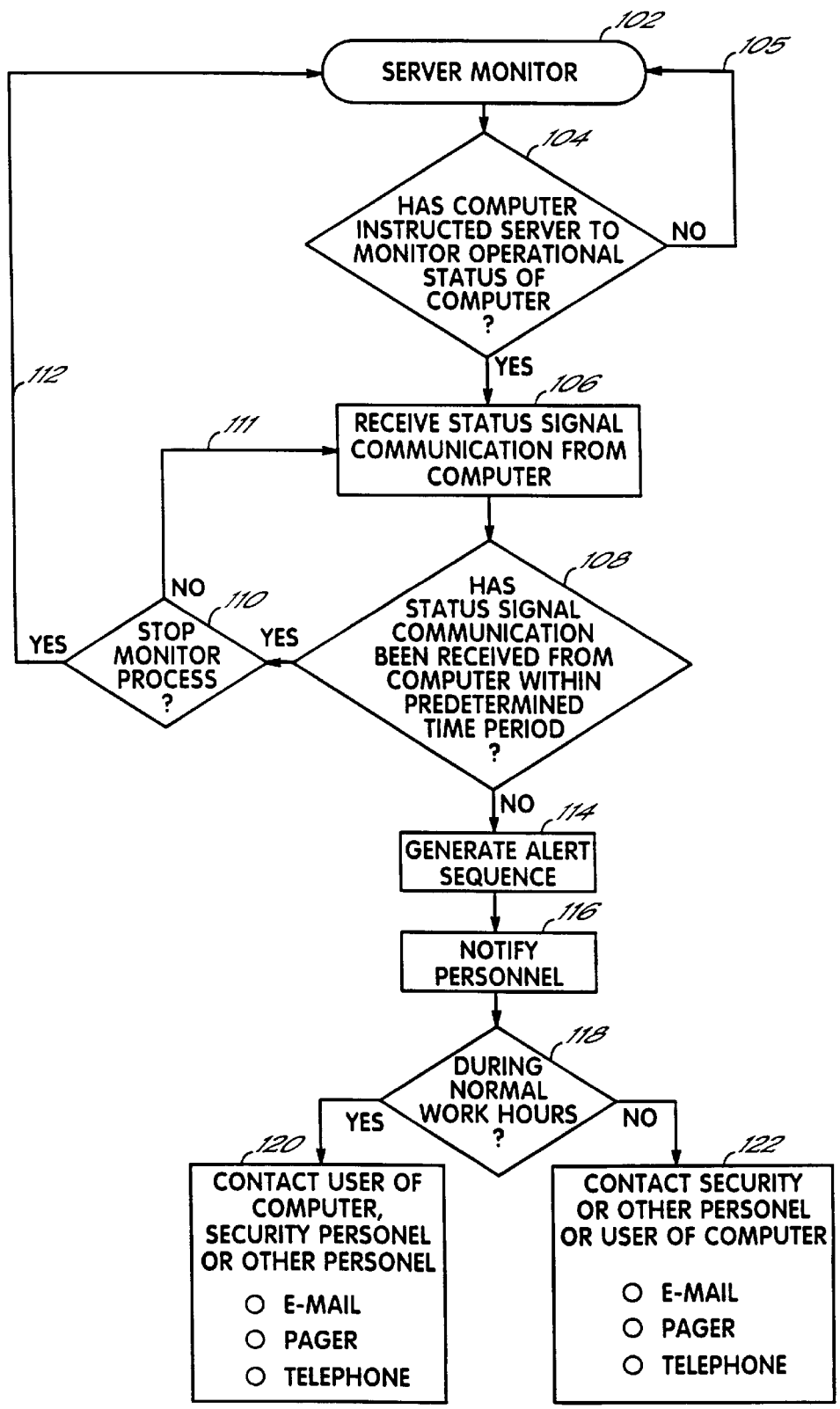
FIG. 6 is a flowchart illustrating the program flow of a program that is part of the Server Monitor application of FIG. 2.

Once the computer 20 is registered with the server 16, the user may request that the computer be monitored by that server. Initiating the monitoring process by clicking on the Start Monitor field 70, the Computer Monitoring program 92 is initiated, as shown in FIG. 5, and the computer notifies the server that monitoring is to begin, as indicated by Block 94. There will generally be a list of computers to be monitored, but not all users of those computers may request that they be monitored at a particular time. Therefore, the Server Monitor application 46 run by the server 16 will check to see for each listed computer whether the owner requests monitoring, as illustrated in FIG. 6. During the monitoring process, the computer generates a status signal communication at predetermined time intervals, as indicated by Block 96. The user enters the desired predetermined time interval, as noted above. The status signal communication may be any form of communication between the computer and server which may serve to indicate that the computer is operational. For example, a communication handshake might be all that is necessary to indicate to the server 16 that the computer 20 is operational. Alternatively, other signals, such as specific messages, might be generated and sent to the server to indicate the operational status of the computer. The computer will generate a status signal communication at a predetermined time interval determined by the input provided in field 66 by the user. For example, in FIG. 3, a period of five minutes is shown in field 66. Therefore, according to the Computer Monitoring program 92, the computer 20 will generate a status signal communication approximately every five minutes. That is, the predetermined time interval is five minutes. The computer will continue to generate the status signal communication repeatedly, every five minutes, until the user indicates that they want to stop the monitoring process as indicated by Block 98. If the user desires to stop the monitoring process, the computer monitoring program ends (Block 100). The predetermined time interval selected by the user is also utilized by the server 16 in determining when to look for each communication from the computer. In that way, the server 16 will know that it is to issue an alert sequence if the communication is late, which would be indicative of a non-operational status of the computer.

Turning now to FIG. 6, a flowchart for the program Server Monitor 102 is illustrated and is part of the overall Server Monitor application 46 run by the server. Server Monitor 102 is a program which is run by the server or other monitoring computer for the purposes of monitoring one or more remote computers, such as remote computers 20 which are coupled thereto and which are registered for and requesting a monitoring process. The Server Monitor program 102 accesses a list of registered remote computers (see Block 77), and will determine which, if any, of those remote computers have instructed the server to monitor their operational status. Accordingly, as illustrated by Block 104, the Server Monitor program 102 determines whether a particular computer on the list of registered computers has instructed the server to monitor its operational status. The server will have received notification from the remote computer (Block 94) that monitoring is to begin, and will proceed accordingly. If no monitoring instruction is received for a particular computer, that computer will not be monitored, as illustrated by path 105.

If the computer has requested monitoring by the server, the server will look to receive the status signal communication from the computer, as indicated by Block 106. In that way, the server monitors the status signal communication to determine the existence of that status signal communication. The server will also determine a predetermined time period in which to receive the status signal communication based upon the predetermined time interval selected by a user in field 66 of FIG. 3. The predetermined time period in which the server will wait for the communication will generally be longer than the predetermined time interval in which the computer generates the status signal communication. In that way, the server 16 will not look for the status signal communication too frequently. For example, if the computer is sending out a status signal communication every five minutes, the server will not want to check every two or three minutes for the status signal communication. If the server did, the status signal communication would always be late as dictated by the server's predetermined time period, and an unnecessary alert sequence may be generated. If the status signal communication is received by the server within a predetermined time period, no alert sequence will be generated and the server will continue to monitor the computer, as illustrated at Block 108. The Server Monitor program 102 will also check to determine whether the user has requested that the monitoring process be stopped, as indicated by Block 110. If the monitoring process is not stopped, the server will continue to monitor the computer based on a predetermined time period, as indicated by loop path 111 in FIG. 6. If the user requests that the monitoring process be stopped, monitoring will stop for that particular computer. However, the Server Monitor program 102 will continue to operate for other computers which are registered for the server and for which monitoring has been requested, as indicated by path 112.

Referring to FIG. 6, the Server Monitor program 102 continues to receive the status signal communications from the computer 20 on a regular basis as determined by the predetermined time interval set by the user. If the server does not receive the status signal communication from the computer within the predetermined time period, that is, if there is an absence of the status signal communication of a remote computer within the predetermined time period, such as if the status signal communication is late, the server detects the absence and interprets the status signal communication absence as a non-operational status for the computer being monitored. The server 16 then generates an alert sequence in response to the absence of the status signal. The alert sequence may be utilized to indicate to a user or other personnel, such as security personnel, that the computer is not operational. That is, a late or absent status signal communication from the computer within the predetermined time period is interpreted by the server as a non-operational status for the computer. As noted above, there may be various reasons for verifying the operational status of the computer. One predominant reason might be to deter and prevent theft of computer components. However, another reason might be to advise the user that the computer has quit operating or has crashed, which may be due to a network outage, operating system problems, power loss, or other causes not necessarily related to removal and theft of critical computer components. Furthermore, in order to minimize the disruption of the computer operation and the work of the user, the alert sequence takes into account the time of day in which it is generated.

To that end, in one embodiment of the invention, the alert sequence may generally be tailored for a specific system in order to provide the most efficient monitoring of a computer and notification of its non-operational status, while minimizing the disruption of the computer's normal operation and the user's work. An alert sequence will generally include the step of notifying personnel, as indicated by Block 116. In one embodiment of the invention, the same personnel, such as security personnel, might be notified at all times regardless of the time of day in which the alert sequence is generated. Alternatively, the personnel notified might depend upon the time of day in which the alert sequence is generated. For example, as illustrated in FIG. 6, the Server Monitor program 102 may test to determine if the alert sequence is generated during normal work hours, as indicated by Block 118. Normal work hours may be defined in any way, but may typically be in the range of 8:00 A.M. to 5:00 P.M. If the alert sequence is generated during normal work hours, the user of the computer would be contacted, as illustrated by Block 120, in any number of possible ways of communication. For example, a telephone call or pager call might be made to the user. Alternatively, an e-mail message might be generated, although if the user's computer is non-operational, an e-mail message might not be effective. If an alert sequence is generated accidentally due to a malfunction in communication between the server and the computer, an e-mail message would be suitable.

By contacting the user, it may be unnecessary to further investigate the matter, as the user may be able to explain the source of the alert sequence. For example, the user may want to add memory to the computer and may have therefore shut down the computer for that purpose. By calling the user, that user is put on notice that the computer is not operational. If the user is the cause for that non-operational status because they have shut the computer down, they can simply disregard the call or page. The call, page, or e-mail message could be sent to the user automatically, such as with a call and a taped recording, or the server might automatically notify security personnel through another remote computer, or through a call or page, and the security personnel might then call, page, or e-mail the user. In that case, the security personnel would not have to respond further if the user advises them that they are aware of the non-operational status of their computer, and the situation is acceptable from a security standpoint.

If the alert sequence is not generated during normal work hours, that is if it is generated in the evening or over the weekend, security may be automatically contacted directly, such as by a call, page, e-mail or computer message from another computer coupled to the server. The security personnel may respond by going to the site of the computer, such as the user's office, to check its status. During such a situation, a theft might be prevented. Alternatively, security personnel or other personnel might be able to notify the computer's user that an important function, such as a desired compiling function, has ceased and that the computer is non-operational. That may allow the user to attend to the problem immediately, rather than waiting until they discover it themselves the next day. It will be appreciated by a person of ordinary skill in the art that an alert sequence might include any number of notification schemes. For example, both the user and security might be contacted simultaneously to address the problem at any time of day. In a further alternative, only security might be contacted. The security personnel could then make the determination as to the next step in investigating the non-operational status of the computer. For example, if the alert sequence is generated during the workday, the security office would then just contact the user themselves. The security personnel would then only have to respond further if they do not get an answer from the user.

As discussed above, the user has the option of selectively requesting that their computer be monitored by the server by providing directions to start and stop monitoring (see FIG. 3). In accordance with another aspect of the present invention, the normal shutdown procedure for the computer might be adapted to request that the monitoring process be stopped. Furthermore, if the monitoring process is stopped through normal shutdown, the normal startup process should also be configured to resume the monitoring process. To that end, the startup and shutdown procedures could be configured as necessary to selectively start and stop the monitoring process. For the purposes of theft deterrence, stopping the monitoring process during a normal shutdown would not be particularly critical because a person stealing the components will generally not have the means to complete a normal shutdown. A normal shutdown will require the user's password, which a thief would not normally have.

The present invention will allow monitoring of computers even after normal work hours when the user is away from the computer. Oftentimes, computers are left on overnight in order to run batch operations, such as a compiling operation. Furthermore, the computers might be left on so that their users may have remote access to the system when they are away from their offices. Therefore, the present invention will also provide monitoring during after work hours for the purposes of theft prevention or to ensure uninterrupted computer operation. The selective monitoring of the computer as determined by the user is particularly useful if the user knows that they will be at their terminal most of the day. In such a scenario, the monitoring in accordance with the principles of the present invention could be stopped or suspended, as desired, because the user will know immediately when their computer is non-operational if they are using it.

An additional advantage of the present invention is that it may be handled completely through software within a network without requiring hardware modifications to the computers being monitored. Accordingly, a large number of computers might be monitored relatively inexpensively without requiring substantial security personnel and time wasted in continuously checking the computers for component loss and/or uninterrupted operation. Furthermore, there are no hardware costs to retrofit all the monitored computers with additional hardware.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for determining the operational status of a computer comprising:

(a) registering a first computer with a monitoring computer, and, at the direction of the first computer independently of a request from the monitoring computer, generating a status signal with the first computer for indicating that the first computer is operational, the status signal being continuously generated at a first predetermined time interval;

(b) monitoring the status signal with the monitoring computer to determine the existence of the status signal;

(c) detecting an absence of the status signal of the first computer within a second predetermined time interval and interpreting said signal absence as a non-operational status of the first computer;

(d) generating an alert sequence in response to the absence of the status signal from the first computer to alert personnel that the first computer is not operational.

2. The method of claim 1 further comprising determining the identity of the first computer and notifying personnel associated with the first computer based upon said identity.

3. The method of claim 1 wherein the alert sequence comprises a first alert mode and a second alert mode, the alert sequence being in the first alert mode at a particular time period of a day and being in the second alert mode at a different time period of the day.

4. The method of claim 3 wherein the alert sequence is in the first alert mode during defined work hours of the day for the first computer and is in the second alert mode during defined non-work hours of the day.

5. The method of claim 1 wherein said alert sequence is generated by the monitoring computer.

6. The method of claim 1 wherein said alert sequence comprises generating a telephone call to the personnel for alerting said personnel to the non-operational status of the first computer.

7. The method of claim 1 wherein said alert sequence comprises generating a pager call to the personnel for alerting said personnel to the non-operational status of the first computer.

8. The method of claim 1 wherein said alert sequence comprises generating an e-mail message for the personnel for alerting said personnel to the non-operational status of the first computer.

9. The method of claim 1 further comprising selectively generating the status signal and monitoring the first computer status signal with the monitoring computer in response to instructions from the first computer.

10. The method of claim 1 further comprising detecting the absence of the first computer status signal within a second predetermined time interval related to the first predetermined time interval.

11. The method of claim 1 further comprising generating an alert sequence based upon instructions from the first computer.

12. An apparatus for determining the operational status of a computer comprising:
   (a) a first computer configured to selectively and continuously generate a status signal at a first predetermined time interval for indicating that the first computer is operational, the status signal being generated at the direction of the first computer independently of a request from a monitoring computer;
   (b) a monitoring computer with memory and a program resident in the memory, the program configured to monitor the status signal of the first computer to determine the existence of the status signal, and to interpret an absence of the status signal within a second predetermined time interval as a non-operational status of the first computer, the program further configured to generate an alert sequence in response to the status signal absence to alert personnel that the first computer is not operational.

13. The apparatus of claim 12 wherein the program of the monitoring computer is further configured to determine the identity of the first computer and notify personnel associated with the first computer based upon said identity.

14. The apparatus of claim 12 wherein the alert sequence comprises a first alert mode and a second alert mode, the alert sequence being in the first alert mode at a particular time period of a day and being in the second alert mode at a second period of the day.

15. The apparatus of claim 12 wherein said program is further configured to generate an alert sequence comprising the generation of one of a telephone call, a pager call and an e-mail message for alerting said personnel to the non-operational status of the first computer.

16. The apparatus of claim 12 wherein the first computer has memory and a program therein which is configured to generate monitoring instructions to the monitoring computer, the program of the monitoring computer further configured to selectively monitor the first computer status signal in response to the monitoring instructions from the first computer program.

17. The apparatus of claim 12 wherein said second predetermined time interval is related to the first computer first predetermined time interval.

18. The apparatus of claim 16 wherein the monitoring computer program is further configured to generate an alert sequence based upon said monitoring instructions from the first computer program.

19. An apparatus comprising:
   (a) a memory;
   (b) a program resident in the memory and configured to monitor, at the direction of a first computer, a status signal of the first computer, which status signal is generated selectively and continuously at a first predetermined time interval at the direction of the first computer, and further configured to determine the existence of the status signal, and to interpret an absence of the status signal within a second predetermined time interval as a non-operational status of the first computer, the program further configured to generate an alert sequence in response to the status signal absence to alert personnel that the first computer is not operational.

20. The apparatus of claim 19 wherein the program is further configured to determine the identity of the first computer and notify personnel associated with the first computer based upon said identity.

21. The apparatus of claim 18 wherein said program is further configured to generate an alert sequence comprising the generation of one of a telephone call, a pager call and an e-mail message for alerting said personnel to the non-operational status of the first computer.

22. A program product f or verifying the operational status of a computer comprising:
   (a) a program configured to monitor, at the direction of a first computer, a status signal of the first computer which is generated selectively and continuously at a first predetermined time interval at the direction of the first computer, and further configured to determine the existence of the status signal, and to interpret an absence of the status signal within a second predetermined time interval as a non-operational status of the first computer, the program further configured to generate an alert sequence in response to the status signal absence to alert personnel that the first computer is not operational;
   (b) a signal bearing media bearing the program.

23. The program product of claim 21, wherein the signal bearing media comprises at least one of a transmission-type media and a recordable media.

* * * * *